United States Patent
Han et al.

(10) Patent No.: US 8,049,785 B2
(45) Date of Patent: Nov. 1, 2011

(54) OPTIMUM IMAGE SELECTION METHOD AND SYSTEM

(75) Inventors: Shih-Chang Han, Taipei (TW);
Chin-Lung Yang, Miaoli County (TW);
Yun-Chin Li, Taipei County (TW)

(73) Assignee: Altek Corporation, Hsinchu (TW)

( * ) Notice: Subject to any disclaimer, the term of this patent is extended or adjusted under 35 U.S.C. 154(b) by 471 days.

(21) Appl. No.: 12/239,121

(22) Filed: Sep. 26, 2008

(65) Prior Publication Data
US 2009/0086057 A1    Apr. 2, 2009

(30) Foreign Application Priority Data
Sep. 28, 2007  (TW) .............................. 96136140 A

(51) Int. Cl.
*H04N 5/225*   (2006.01)

(52) U.S. Cl. ................................ 348/208.99; 348/231.2

(58) Field of Classification Search ........................ None
See application file for complete search history.

(56) References Cited

FOREIGN PATENT DOCUMENTS
JP         2002112100 A   *   4/2002
* cited by examiner

*Primary Examiner* — Jason Chan
*Assistant Examiner* — Angel L Garces-Rivera
(74) *Attorney, Agent, or Firm* — Rosenberg, Klein & Lee

(57) ABSTRACT

An optimum image selection method for a digital photograph device selecting an optimum image by driving a vibration detection sensor mechanism is provided. In continuous photography mode, as soon as capturing an image, it detects and records the vibration amount of the image, and then compares the presently detected vibration amount with the vibration amount of the image which is stored formerly, and if the vibration amount detected presently is smaller, the image captured presently will be stored, so the clearest image will be distinguished and retained immediately by using the vibration amount.

8 Claims, 4 Drawing Sheets

OPTIMUM IMAGE SELECTION METHOD AND SYSTEM

BACKGROUND OF THE INVENTION

1. Field of the Invention

The present invention relates to an optimum image selection method and system, in particular, to an optimum image selection method and system in a digital photograph device.

2. Description of Related Art

In a conventional digital photograph device, e.g. digital camera (hereunder taking digital camera for example), in the aspects of operation and design, the objective is all to obtain images with clear and high quality. Presently, to achieve such an objective, it is generally by means of improving optical, mechanical and electrical elements therein. In addition to the above-mentioned approaches, it is also possible to use continuous photography mode to further select clearer images from a series of continually captured images.

The digital camera currently available on the market, when operating in optimum selection continuous photography, mostly compresses the captured images then saves them continually in memory so as to efficiently use the storage space. Upon the end of photography process, it then takes the captured images from the memory, and after decompression process, proceeds to analyze image clarity, compares these images, then saves the image of highest clarity and deletes the remaining ones with less satisfactory quality.

However, the aforementioned image analysis approach is not able to determine the image quality immediately, since such a process consumes a relatively longer time, and requires larger memory volume to store the captured intermediate images.

SUMMARY OF THE INVENTION

For achieving the objective of images with high quality, in view of the issues concerning design complexity and high cost in prior art; as well as the unnecessary time consumption and storage space occupation caused by the collective processes on images with less satisfactory quality in continuous photography mode, the present inventor employs the amount of vibration during the capture of each image to determine whether the image is to be saved or not for acquiring the optimum image, so as to create the advantages of lower cost and time/space saving, meanwhile the performance thereof can also be maintained.

Therefore, the objective of the present invention is to provide an optimum image selection method and system applicable to a digital photograph device in continuous photography mode, so that it saves time in image analysis during the optimum image selection process.

Another objective of the present invention is to provide an optimum image selection method and system applicable to a digital photograph device in continuous photography mode, so that it requires less memory capacity during the optimum image selection process.

The present invention discloses an optimum image selection method for a digital photograph device in continuous photography mode, wherein it is possible to freely determine the quantity of optimum image selection and whose steps include: initially, detecting whether a trigger signal is input, in which the trigger signal is input to the digital photography device by a user; afterwards, detecting periodically in intervals at least one vibration amount, such that each vibration amount corresponds to each captured image during continuous photography mode, comparing the value of vibration amount obtained in each detection with at least one base vibration amount, and if the value is smaller than the base vibration amount, then the value of the base vibration amount is replaced and an image capture signal is accordingly generated to capture the captured image which corresponds to the said vibration amount and is stored as the presently optimum image, and clearing the intermediate image to which the replaced base vibration amount corresponds; finally, repeating the last step, until that the continuous photography process ends and the last stored captured image is the optimum image.

The present invention further discloses an optimum image selection method for a digital photograph device in continuous photography mode, wherein it is possible to freely determine the quantity of optimum image selection and whose steps include: initially, detecting whether a trigger signal is input, in which the trigger signal is input to the digital photography device by a user; afterwards, generating periodically in intervals an image capture signal, and at the same time, detecting a vibration amount corresponding to each image capture signal, then performing vibration amount comparison process, wherein the value of vibration amount obtained in each detection is compared with at least one base vibration amount, and if the value is smaller than the base vibration amount, then the value of the base vibration amount is replaced and the captured image generated by the image capture signal to which the vibration amount corresponds is stored as the presently optimum image, and clearing the captured image to which the replaced base vibration amount corresponds, otherwise interrupting the image capture signal; finally, repeating the last step, until that the continuous photography process ends and the last stored captured image is the optimum image.

The present invention yet further discloses an optimum image selection method for a digital photograph device in continuous photography mode, wherein it is possible to freely determine the quantity of optimum image selection and whose steps include: initially, detecting whether a trigger signal is input, in which the trigger signal is input to the digital photography device by a user; afterwards, storing the captured image of each capture during continuous photography mode, and detecting and recording the vibration amount in each image capture; finally, until that continuous photography mode ends, selecting an captured image to which the value of at least one smallest vibration amount corresponds as the optimum image intended to be retained, while that the rest captured images are cleared.

The present invention still yet further discloses an optimum image selection system, which is applicable for selecting at least one optimum image from a digital photograph device in continuous photography mode. The said system includes a vibration detection module, a control module, an image capture module and a storage module, wherein the vibration detection module is coupled with the control module for detecting a vibration amount; the control module is used to receive a trigger signal, so as to generate at least an image capture signal, each image capture signal corresponding to a vibration amount, and the control module determines, based on the vibration amount, whether the at least one image generated by the driving of the image capture signal is to be stored as the optimum image; the image capture module is coupled with the control module, which is used to receive the image capture signal to generate images; and the storage module is coupled with the control module, which is used to store captured images. Upon the initiation of continuous photography mode, the control module controls the image capture module to capture a plurality of images, and, through the vibration detection module, respectively records the vibration amount in each photograph action of the image capture module, and then based on these vibration amounts, determines the said at least one captured images as the optimum image.

The summary illustrated supra and the subsequent details description and appended diagrams are all for the purpose of further explaining the means, measures and effects taken by the present invention to achieve the prescribed objectives. Other purposes and advantages of the present invention will be set out in the following description and diagrams.

DETAILED DESCRIPTION OF THE PREFERRED EMBODIMENTS

For a digital photograph device, the vibration amount generated during photograph process directly impacts the clarity of image, and usually the smaller the vibration amount is, the clearer the image taken becomes. Therefore, for the application of digital photograph device, the present invention, in a continuous photography mode, particularly records the vibration amount during the process, and afterwards, based on such vibration amount, quickly and conveniently determines which of the images taken in this continuous photography mode can be rated as an optimum image.

Figure 1:
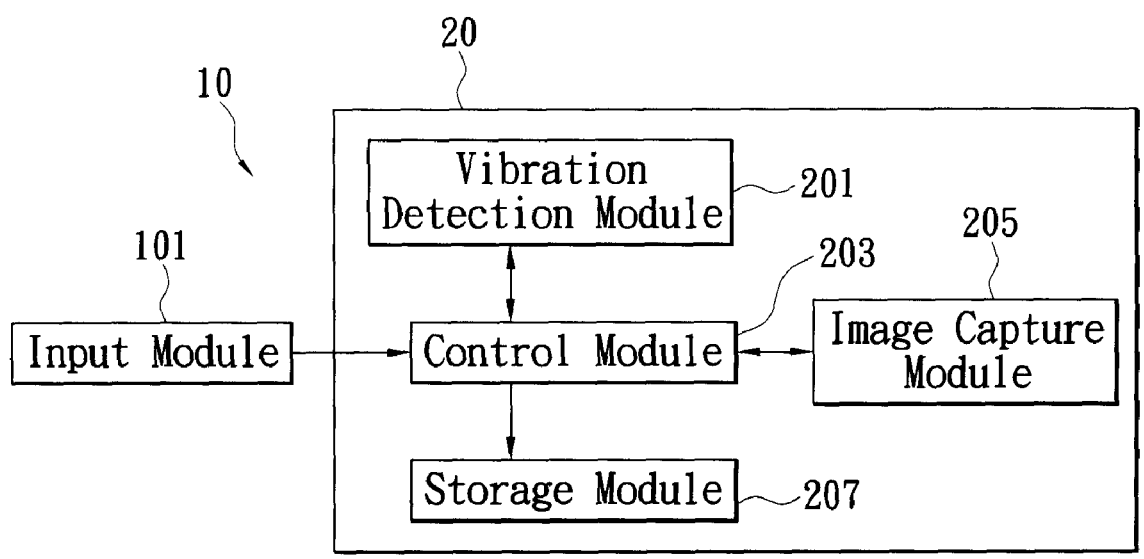
FIG. 1 is a diagram of a digital photograph device disclosed by the present invention and an embodiment of the system architecture of the optimum image selection system thereof.

Refer now to FIG. 1, wherein the depicted embodiment illustrates a digital photograph device 10 disclosed by the present invention and a system architecture of the optimum image selection system 20 thereof. The digital photograph device 10 illustrated by the depicted embodiment includes an input module 101 and an optimum image selection system 20. The input module 101 is coupled with the optimum image selection system 20 for receiving the control from a user, as so to generate a trigger signal, in which, in the present embodiment, the said trigger signal is used, for example, to initiate continuous photography mode of the digital photograph device; upon initiation of continuous photography mode, it is to execute a series of image capture actions, there between spaced with a fixed time interval, and the quantity of image taken in continuous photography mode can be set by the optimum image selection system 20.

The optimum image selection system 20 further includes a vibration detection module 201, a control module 203, an image capture module 205 and a storage module 207. Here the vibration detection module 201 is coupled with the control module 203, detecting the vibration amount of each image capture action during continuous photography mode; the control module 203, after reception of the trigger signal, generates at least an image capture signal, and when each image capture signal is outputted to the image capture module 205, the control module 203 responds and records a vibration amount through the vibration detection module 201. The image capture module 205 is coupled with the control module 203, which is used to receive the image capture signal for the execution of image capture action so as to generate image. The control module 203 further, based on the determination of the vibration amount, decides whether to store the at least one image generated by the image capture module 205 driven by the image capture signal as the optimum image, and saves the said optimum image to the storage module 207.

The optimum image selection system 20 can be employed to select at least one optimum image in the digital photograph device 10 under continuous photography mode, wherein the digital photograph device 10 may be a cellular phone, digital camera or digital cam recorder. The above-mentioned optimum image selection system may further include a display module (not shown), so as to display the captured images.

Figure 2:
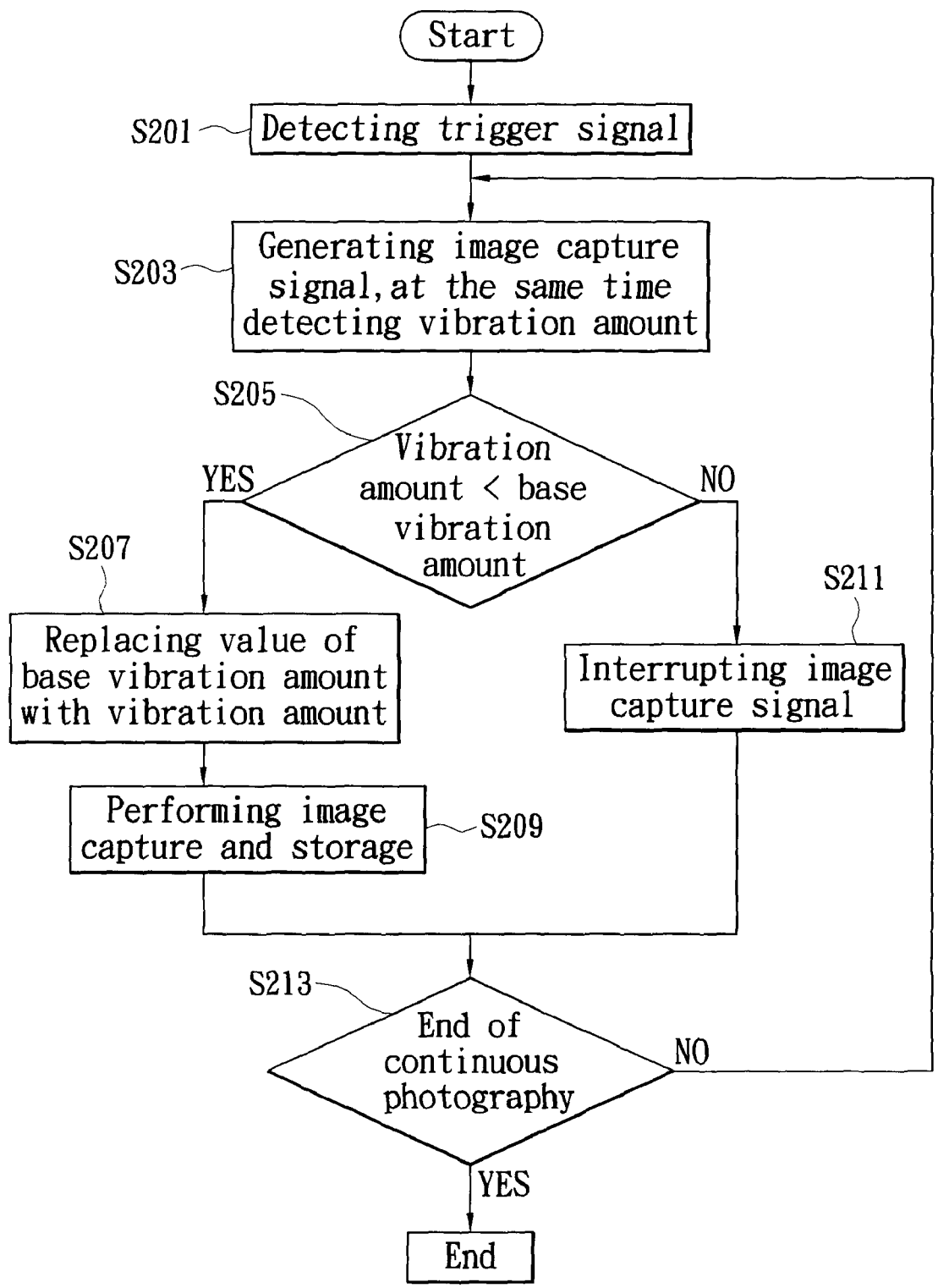
FIG. 2 is a stepwise flowchart of an embodiment of the optimum image selection method in a digital photograph device disclosed by the present invention.

Next, referring to FIG. 2, a stepwise flowchart of an embodiment of the optimum image selection method in a digital photograph device disclosed by the present invention is shown. The related system architecture can be referred collectively to FIG. 1. As shown in FIG. 2, the optimum image selection method includes the following steps:

Initially, detecting whether a trigger signal is input, wherein the trigger signal is input to the digital photograph device 10 by a user. When the control module 203 detects the trigger signal (S201), the control module 203 generates an image capture signal, and at the same time as the image capture signal generated detects a corresponding vibration amount (S203).

Subsequently, comparing the said vibration amount with a base vibration amount in the control module 203 (S205), wherein the initial value of the base vibration amount may be set as the maximum of vibration amount detectable in the digital photograph device 10 or set by the user, and the base vibration amount may be also prescribed in the control module 203 for comparison. If the comparison in step S205 shows that the vibration amount is smaller than the base vibration amount, then the current base vibration amount will be replaced by the current vibration amount (S207); then, the image capture module 205 further takes an image according to the received image capture image, and saves the captured image in the storage module 207 (S209). If a captured image is already saved there in the storage module 207, then the new captured image will replace the old one. Otherwise, if the determination in step S205 is negative, then the control module 203 interrupts the output of the image capture signal to the image capture module 205, so as to stop the present photography action (S211).

Next, the process will continue to determine if the continuous photography ends (S213), and if the continuous photography is still effective, meaning it is required to perform next image capture action, then the process returns to step S203 to carry on, wherein the image capture signal will be output periodically in intervals. Finally, according to the obtained operation result in FIG. 2, when continuous photography mode ends, the image saved in the storage module 207 is the optimum image intended to be retained.

In FIG. 2, it is essentially that, during continuous photography mode, the process will compare the vibration amount generated in each photography action with a base vibration amount, and according to the comparison, determine whether the vibration amount should replace the base vibration amount, and whether the captured image should be stored, so as to locate the smaller vibration amount during continuous photography mode. The image to which the said smaller vibration amount corresponds is the optimum image, and the storage module 207 stores only the said optimum image. Thus the storage module 207 is relatively not required to provide bigger space to store all images captured during continuous photography mode.

Figure 3:
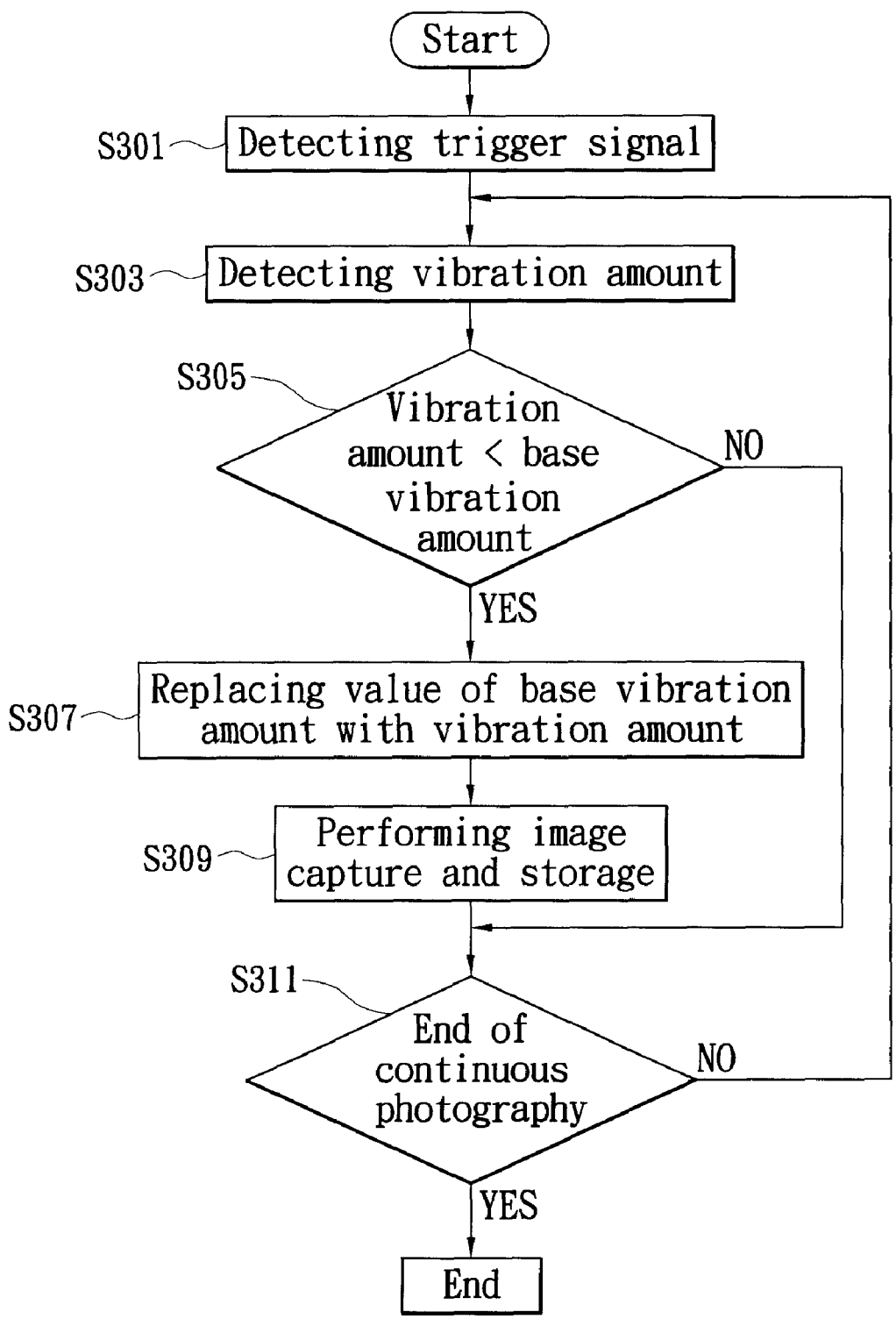
FIG. 3 is a stepwise flowchart of another embodiment of the optimum image selection method in a digital photograph device disclosed by the present invention.

Referring now to FIG. 3 for another embodiment of the present invention, therein a stepwise flowchart of an embodiment of the optimum image selection method in a digital photograph device disclosed by the present invention is shown. The related system architecture can be referred collectively to FIG. 1. As shown in FIG. 3, the said optimum image selection method includes the following steps:

Initially, detecting whether a trigger signal is input, wherein the trigger signal is input to the digital photograph device 10 by a user. When the control module 203 detects the trigger signal (S301), continuous photography mode is initiated and the vibration detection module 201 detects a vibration amount thereof (S303).

Subsequently, comparing the said vibration amount with a base vibration amount in the control module 203 (S305), wherein the initial value of the base vibration amount may be set as the maximum of vibration amount detectable in the digital photograph device 10 or set by the user, and if the vibration amount is smaller than the base vibration amount, then the current base vibration amount will be replaced by the vibration amount (S307); afterwards, the control module 203 generates an image capture signal to the image capture module 205 to take an image and saves it in the storage module 207 (S309). If a captured image is already saved there in the storage module 207, then the new captured image will replace the old one. Otherwise, if the determination in step S305 is negative, then the process jumps to step S311 and proceeds.

Next, the process continues to determine whether continuous photography mode ends (S311), and if continuous photography mode is still effective, then it returns to step S300 and carries on.

The method depicted in FIG. 2 is essentially that, upon each photography action taken during continuous photography mode, a present vibration amount is detected at the same time as the output of the image capture signal, and then the comparison action of vibration amount determination is performed; as for the method process illustrated in FIG. 3, it, upon each photography action taken during continuous photography mode, detects first the vibration amount, subsequently performs vibration amount comparison, and afterwards determines the output image capture signal based on the comparison result. The approach shown in FIG. 3 can avoid the occurrence of a situation that, in FIG. 2, after the generation of an image capture signal, it may be required to be interrupted due to the determination result of vibration amount.

Figure 4:
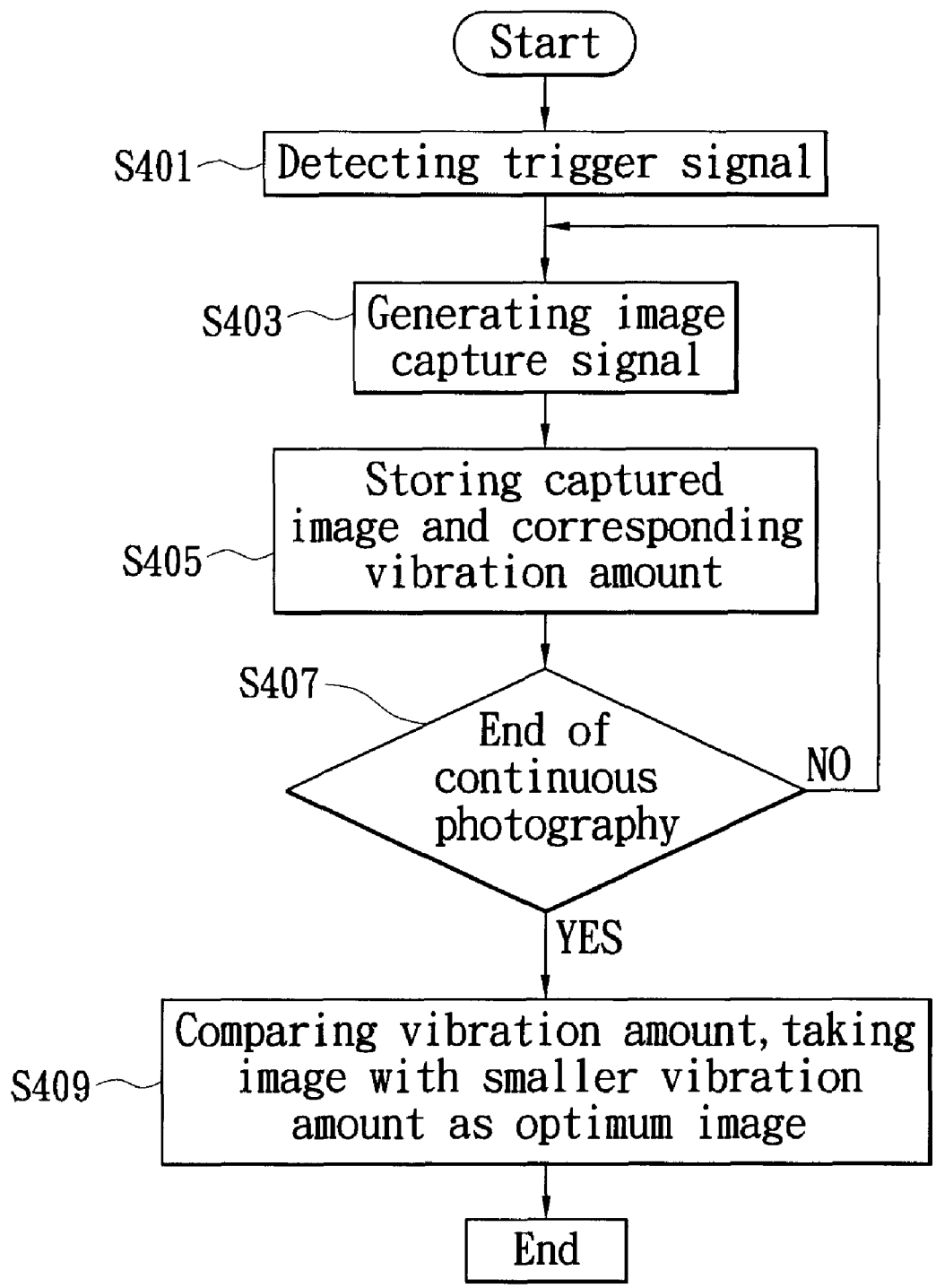
FIG. 4 is a stepwise flowchart of yet another embodiment of the optimum image selection method in a digital photograph device disclosed by the present invention.

Referring now to FIG. 4 for yet another embodiment of the present invention, therein a stepwise flowchart of an embodiment of the optimum image selection method in a digital photograph device disclosed by the present invention is shown. The related system architecture can be referred collectively to FIG. 1. As shown in FIG. 4, the said optimum image selection method includes the following steps:

Initially, detecting whether a trigger signal is input, wherein the trigger signal is input to the digital photograph device 10 by a user. When the control module 203 detects the trigger signal (S401), the control module 203 generates an image capture signal so as to output to the image capture module 205, and at the time when the image capture signal is generated detects a corresponding vibration amount (S403). Afterwards, the image capture module 205 performs capture action to take an image according to the image capture signal, and the captured image as well as the corresponding vibration amount are stored in the storage module 207 (s405).

Subsequently, determining whether continuous photography mode ends (S407); if the determination is negative, then the process returns to step S403 to continue. Whereas, if the determination is YES, then the control module 203 compares the vibration amounts stored in the storage module 207 and locates the smallest vibration amount. The captured image to which the smallest vibration amount corresponds is the optimum image (S409), and the control module 203 retains only the optimum image in the storage module 207, while the rest ones will be deleted, so as not to occupy the storage space available in the storage module 207.

The above-mentioned method for optimum image selection shown in step S409 of FIG. 4 may be also implemented in other approaches. For example, the control module 203 may compare all vibration amounts stored in the storage module 207 with a base vibration amount, and locates the captured image to which the vibration amount being smaller then the base vibration amount corresponds as the optimum image. In this way of selection, it is possible to obtain one or more optimum images.

Furthermore, the processes disclosed in FIGS. 2 and 3 describe that, in each image capture action during continuous photography mode, it is through the approach of vibration amount comparison to immediately determined that whether the captured image should be stored or not, and such an approach, in terms of the digital photograph device with limited storage capacity, can avoid saving images of less satisfactory quality taken during continuous photography mode in the storage module 207. As for the process disclosed in FIG. 4, it first saves all captured images and, through the approach of vibration amount comparison, determines the optimum image as continuous photography mode ends. Such an approach can perform the vibration amount comparison action once when continuous photography mode ends, instead of doing the vibration amount comparison action each time when an image is captured.

FIGS. 2, 3 and 4 disclose methods for selecting only one optimum image. In case it is required to select N optimum images, i.e., providing N base vibration amounts for comparison, then during continuous photography mode, the vibration amount generated in each image capture action will be compared with the N base vibration amounts, and at last only N smallest vibration amounts and the corresponding captured images will be retained, saving these captured images as the optimum images.

Through the aforementioned embodiments, it is appreciated that the optimum image selection method and system disclosed in the present invention is, by means of determining the value of vibration amount in each image capture, to decide whether an optimum image should be stored. When a user performs optimum selection continuous photography, it is to use the control module 203 for recording the vibration amount of the digital photograph device 10 during the capture, and the smaller the vibration amount is, the clearer the captured image can become. Hence, as shown in FIGS. 2 and 3, before the next image is stored, it will be compared with the previously saved image in terms of vibration amount, and if the vibration amount thereof is smaller than the previous one, then the previously stored image will be deleted and the currently one retained; otherwise, the image capture process will be directly interrupted. Thus, for each captured image, it will be compared with the previously stored image in terms of vibration amount, and only the image with the smallest vibration amount will be held. Alternatively, it is also possible to acquire the optimum image via the above-mentioned fourth approach. The advantages of the present invention are:

1. In continuous photography mode, since the comparison of vibration amount requires less time, it is possible to determine immediately and retain clear images, thus time for massive image analysis can be reduced.

2. Since the optimum image is determined by vibration amount comparison, it does not require large memory to store intermediate images during continuous photography, hence the storage space can be save, achieving the effect of low cost.

The above-mentioned descriptions illustrate merely the embodiments and drawings of the present invention, without any intention to limit the present invention thereto. The entire scope of the present invention should be based on the subsequent claims. Any changes, substitutions or modifications that skilled ones in the art can easily consider or contemplate should all be encompassed by the range of the present invention delineated by the claims.

What is claimed is:

1. An optimum image selection method which is applicable for selecting at least one optimum image in a digital photograph device in a continuous photography mode, comprising:
    upon an initiation of the continuous photography mode, recording a vibration amount to which each image capture action corresponds and a captured image thereby;
    performing a vibration amount comparison for each image capture action in the continuous photography mode, comprising:
        comparing a value of each recorded vibration amount with a base vibration amount;
        when the recorded vibration amount is smaller than the base vibration amount, substituting the base vibration amount by the recorded vibration amount; and
        otherwise, generating an image capture signal to drive an image capture module.

2. The optimum image selection method according to claim 1, wherein the initiation of the continuous photography mode is through an input of a trigger signal to the digital photograph device.

3. The optimum image selection method according to claim 1, wherein the vibration amount is recorded in intervals.

4. The optimum image selection method according to claim 1, further comprising:
    storing the captured images taken by the image capture module driven by the image capture signal to a storage module.

5. The optimum image selection method according to claim 4, wherein storing the captured image into the storage module further comprises determining whether the storage module stores an earlier-captured image, before storing the captured image to the storage module,
    and deleting the earlier-captured image when determining the storage module stored the earlier-captured image.

6. The optimum image selection method according to claim 5, wherein, after the continuous photography mode terminates, the captured image which is stored in the storage module is the optimum image.

7. The optimum image selection method according to claim 1, wherein an initial value of the base vibration amount is a maximum vibration amount detectable in the digital photograph device.

8. The optimum image selection method according to claim 1, wherein an initial value of the base vibration amount is a user-defined value.

* * * * *